(12) United States Patent
Kang et al.

(10) Patent No.: US 8,260,294 B2
(45) Date of Patent: Sep. 4, 2012

(54) METHOD FOR MANAGING INTERNET PROTOCOL HANDOFF IN NETWORK SYSTEM

(75) Inventors: Sung Soo Kang, Daejeon (KR); Sang-Kwon Kim, Daejeon (KR)

(73) Assignee: Electronics and Telecommunications Research Institute (KR)

(*) Notice: Subject to any disclaimer, the term of this patent is extended or adjusted under 35 U.S.C. 154(b) by 583 days.

(21) Appl. No.: 12/513,155

(22) PCT Filed: Oct. 29, 2007

(86) PCT No.: PCT/KR2007/005339
§ 371 (c)(1), (2), (4) Date: Apr. 30, 2009

(87) PCT Pub. No.: WO2008/060044
PCT Pub. Date: May 22, 2008

(65) Prior Publication Data
US 2010/0111038 A1    May 6, 2010

(30) Foreign Application Priority Data
Nov. 15, 2006   (KR) .................. 10-2006-0112893

(51) Int. Cl.
*H04W 4/00* (2009.01)
(52) U.S. Cl. ...................... 455/435.1; 370/328
(58) Field of Classification Search .................. None
See application file for complete search history.

(56) References Cited

U.S. PATENT DOCUMENTS

| | | | |
|---|---|---|---|
| 6,167,263 A | 12/2000 | Campbell | |
| 6,708,030 B1 | 3/2004 | Horikawa | |
| 6,947,401 B2 | 9/2005 | El-Malki et al. | |
| 6,980,802 B2 | 12/2005 | Jung | |
| 6,992,995 B2 | 1/2006 | Agrawal et al. | |

(Continued)

FOREIGN PATENT DOCUMENTS

JP   2004214869   7/2004

(Continued)

OTHER PUBLICATIONS

Chen, J.-C., et al., "Mobility Management", IP-Based Next-Generation Wireless Networks: Systems, Architectures, and Protocols, Chapter 4, John Wiley & Sons, Inc., (2004), pp. v-xxiii; 161-301.

(Continued)

*Primary Examiner* — Anh-Vu Ly
(74) *Attorney, Agent, or Firm* — Blakely Sokoloff Taylor & Zafman

(57) ABSTRACT

There is provided a method of processing Internet Protocol (IP) handoff of a mobile node in a network system, in which the IP handoff is processed distinguishing a signal packet path for the IP handoff from a data packet path the method including receiving a registration request message when the mobile node moves to an arbitrary mobile agent, the message received from the mobile node via the mobile agent to which the mobile node moves; transmitting the received registration request message to a mobile agent where the mobile node is previously located, without change, according to whether an entry with respect to the mobile node exists in preset visitor list; and transmitting a registration reply message with respect to the registration request message to the mobile agent without change.

14 Claims, 12 Drawing Sheets

U.S. PATENT DOCUMENTS

| | | |
|---|---|---|
| 7,016,331 B1 | 3/2006 | Joo et al. |
| 7,031,709 B2 | 4/2006 | Watanabe et al. |
| 2001/0036834 A1 | 11/2001 | Das et al. |
| 2003/0018810 A1 | 1/2003 | Karagiannis et al. |
| 2004/0037260 A1* | 2/2004 | Kakemizu et al. ............ 370/338 |
| 2004/0105408 A1 | 6/2004 | Suh et al. |
| 2004/0136348 A1 | 7/2004 | Han |
| 2005/0041607 A1 | 2/2005 | Omae et al. |
| 2005/0114543 A1 | 5/2005 | Popovich et al. |
| 2005/0128979 A1 | 6/2005 | Wu et al. |
| 2006/0067271 A1 | 3/2006 | Chen et al. |
| 2006/0126563 A1 | 6/2006 | Kang et al. |
| 2008/0279150 A1* | 11/2008 | Shousterman et al. ....... 370/331 |
| 2009/0154672 A1* | 6/2009 | Kang et al. ................. 379/93.09 |
| 2009/0180445 A1* | 7/2009 | Ue ................................ 370/332 |
| 2010/0020766 A1* | 1/2010 | Kang et al. .................... 370/331 |
| 2010/0046469 A1* | 2/2010 | Kang et al. .................... 370/331 |
| 2010/0100639 A1* | 4/2010 | Kang et al. .................... 709/242 |
| 2010/0150110 A1* | 6/2010 | Dutta et al. ................... 370/331 |
| 2010/0322186 A1* | 12/2010 | Kang et al. .................... 370/331 |

FOREIGN PATENT DOCUMENTS

| | | |
|---|---|---|
| JP | 2006121647 | 5/2006 |
| KR | 1020010098088 | 11/2001 |
| KR | 1020030017194 | 3/2003 |
| KR | 1020050062798 | 6/2005 |

OTHER PUBLICATIONS

De Silva, P., et al., "A Mobility Management Protocol for IP-Based Cellular Networks", IEEE Wireless Communications, vol. 9, Issue 3, (Jun. 2002), 31-37.

Djuknic, G. M., et al., "Establishing Wireless Communications Services via High-Altitude Aeronautical Platforms: A Concept Whose Time Has Come?", IEEE Communications Magazine, vol. 35, Issue 9, (Sep. 1997), 128-135.

Gavan, J., "Stratospheric Quasi-Stationnary Platforms: (SQ-SP) Complementary to Radio Satellite Systems", Electrical and Electronics Engineers in Israel, 1996, (Nov. 1996), 283-286.

Ohmori, S., et al., "The Future Generations of Mobile Communications Based on Broadband Access Technologies", IEEE Communications Magazine, vol. 38, Issue 12, (Dec. 2000), 134-142.

* cited by examiner

[Fig. 1]
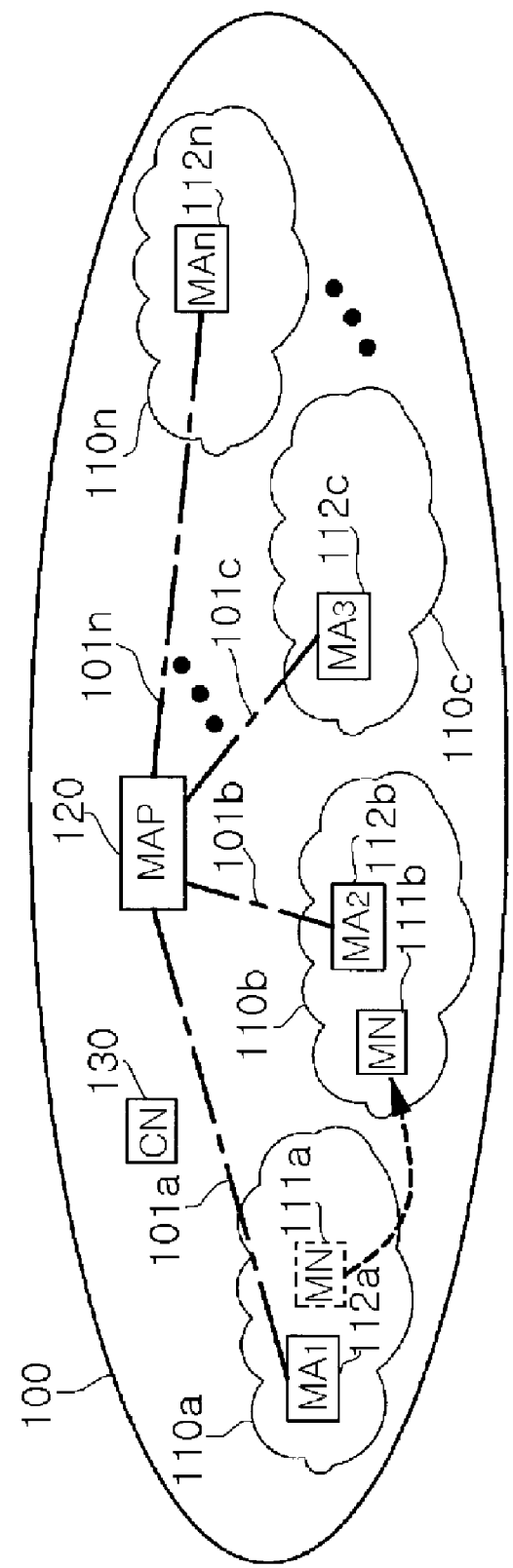

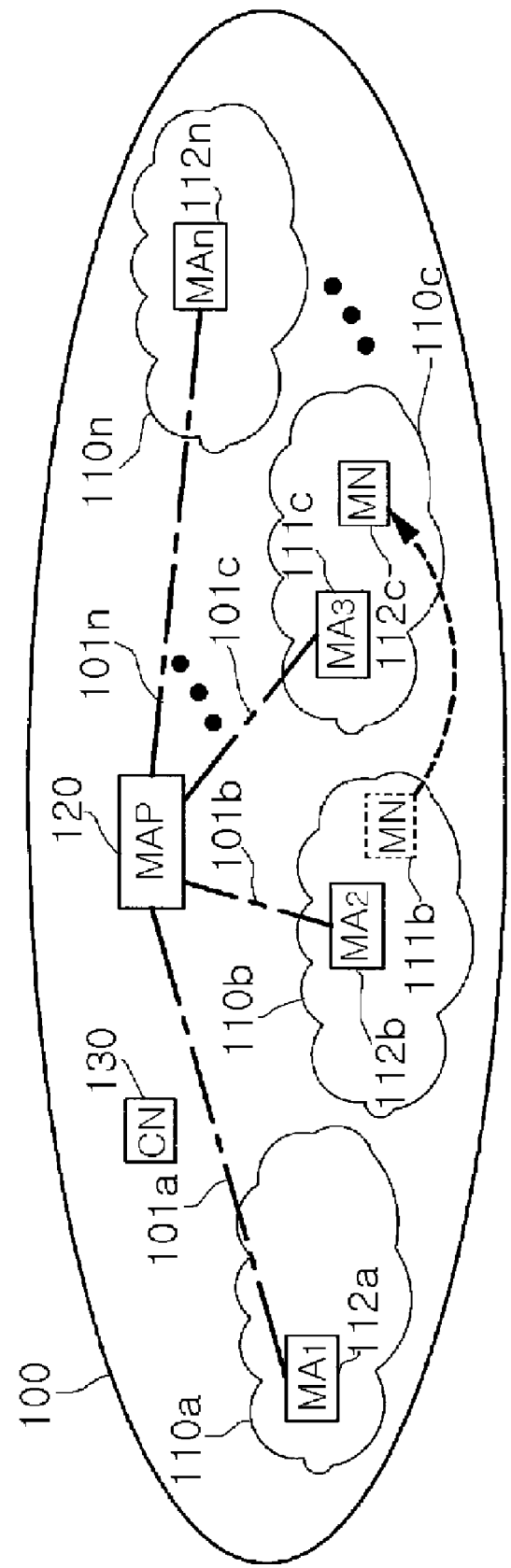
[Fig. 2]

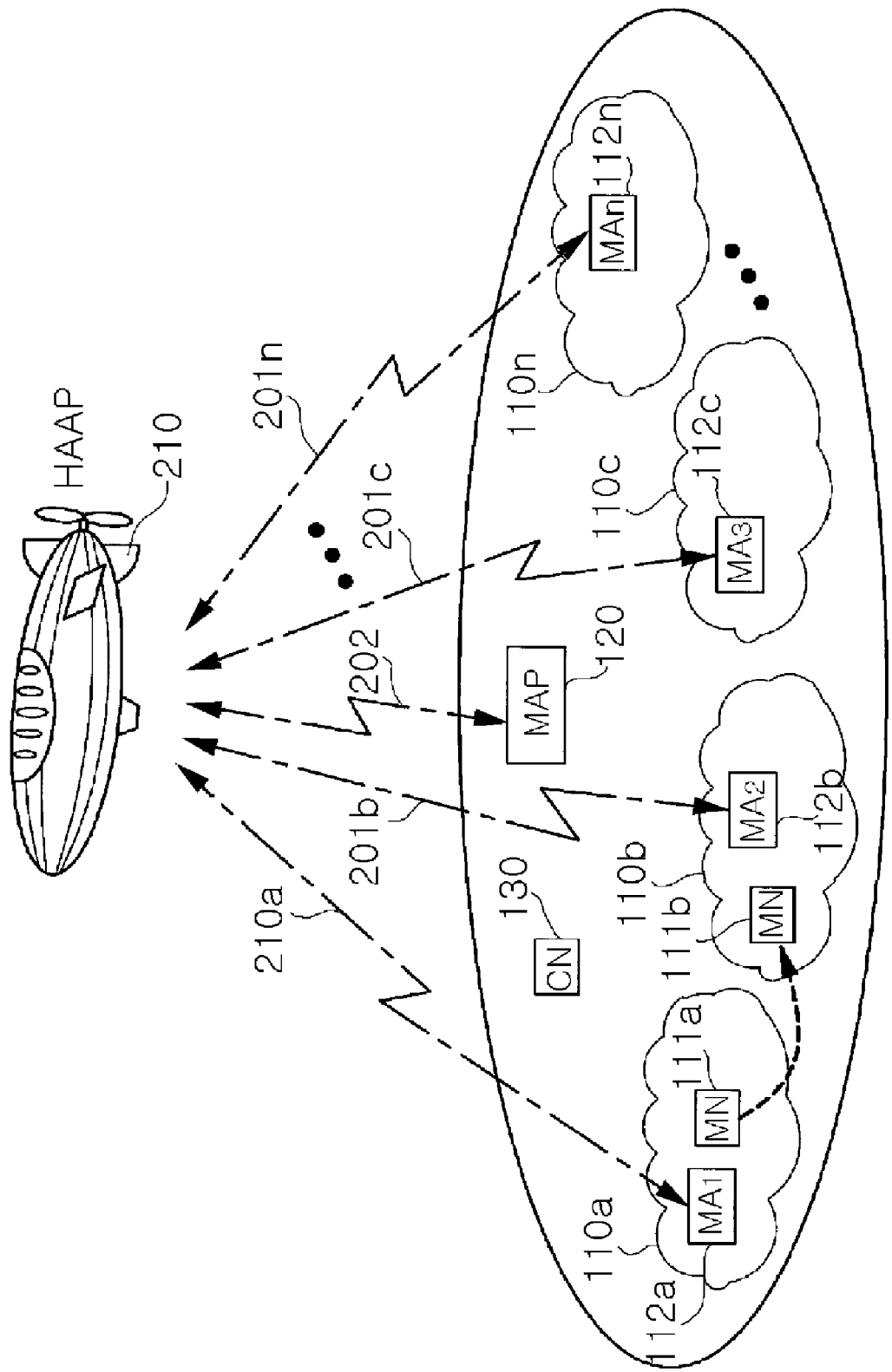
[Fig. 3]

[Fig. 4]
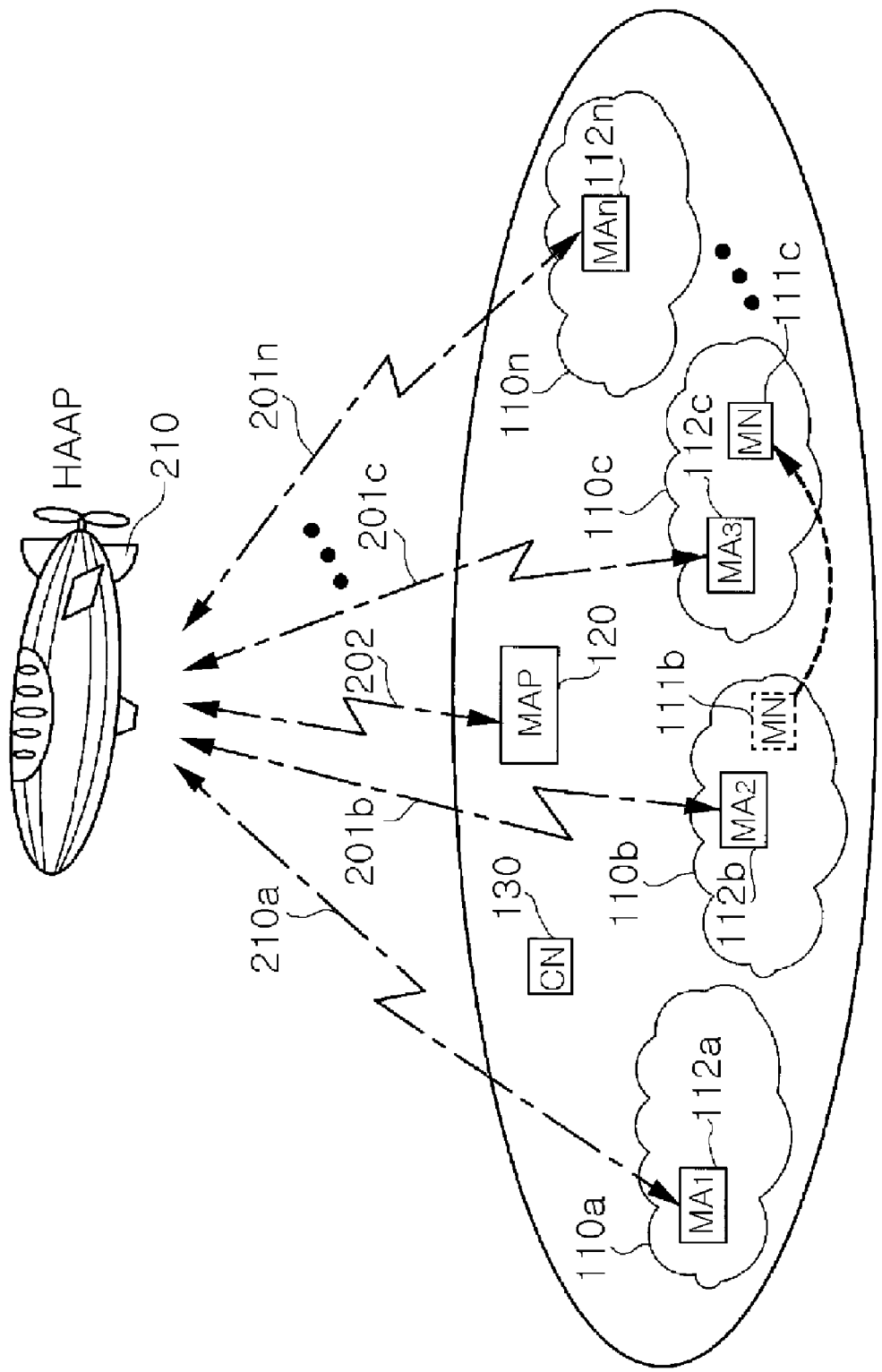

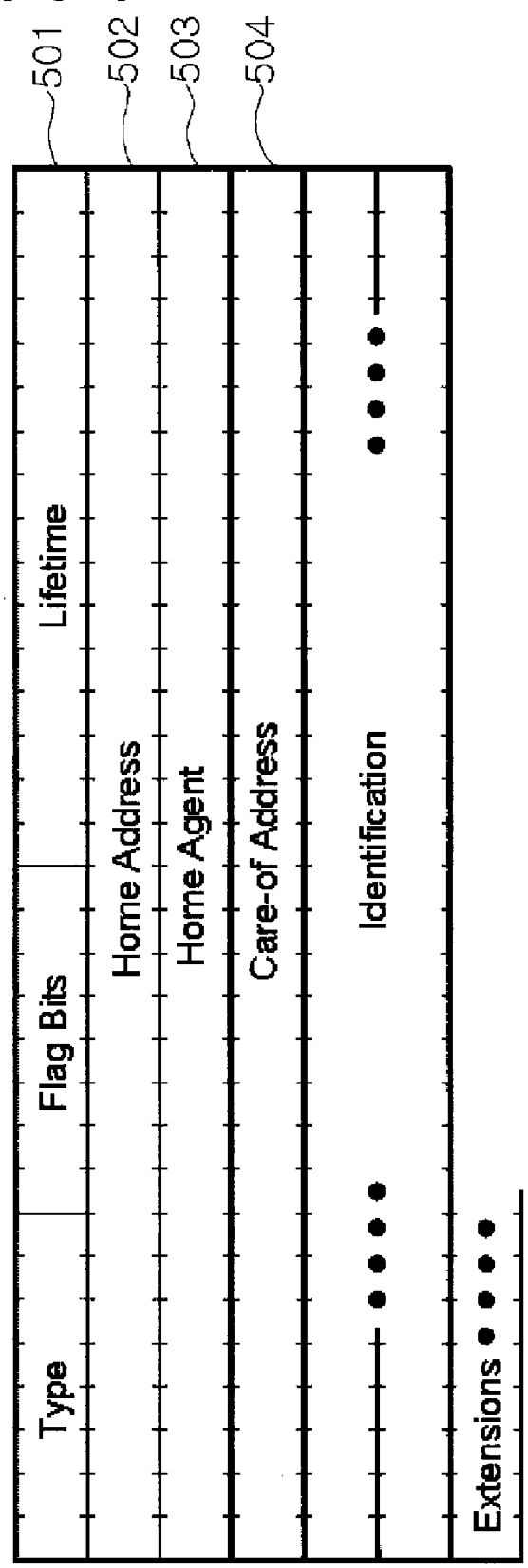
[Fig. 5]

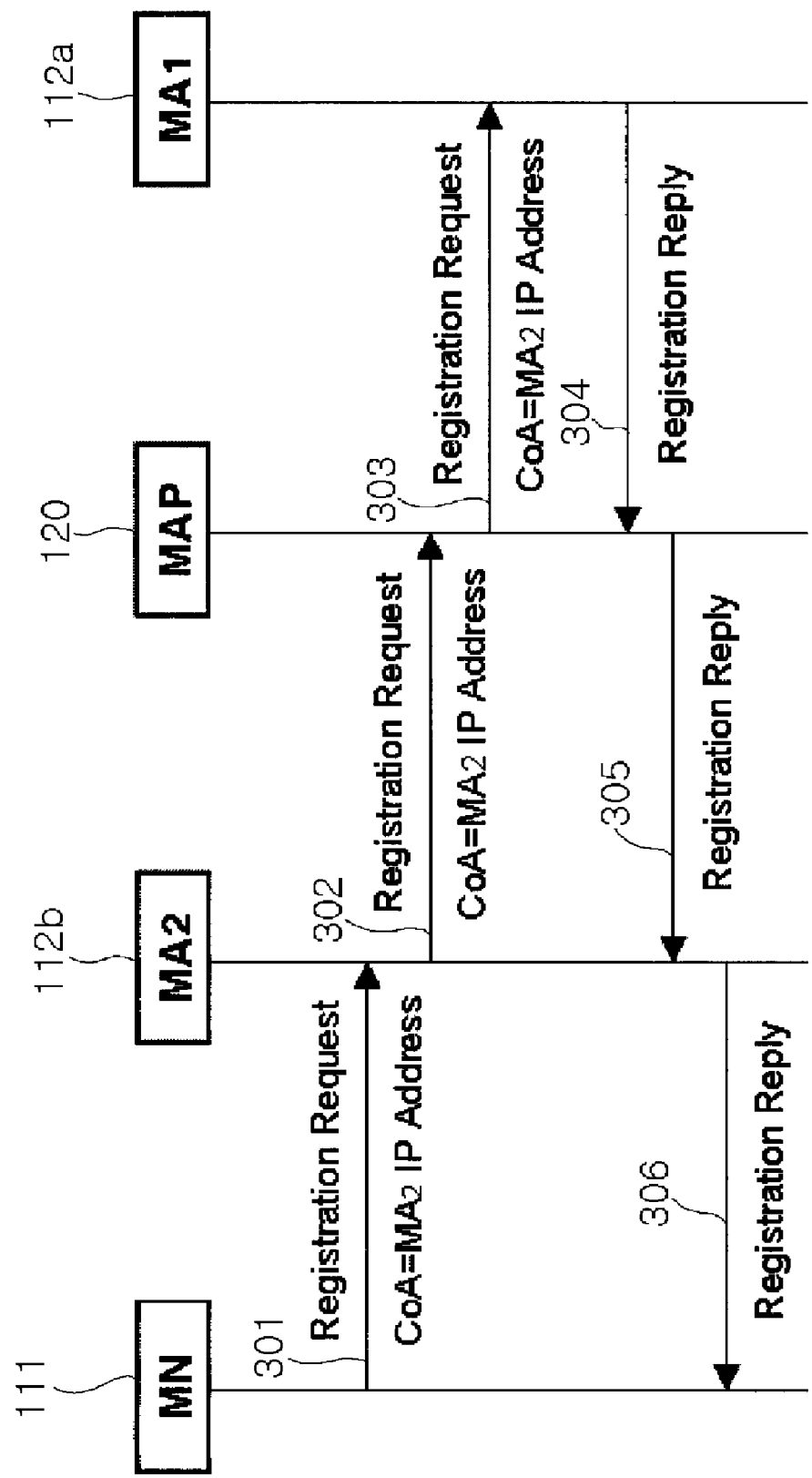
[Fig. 6]

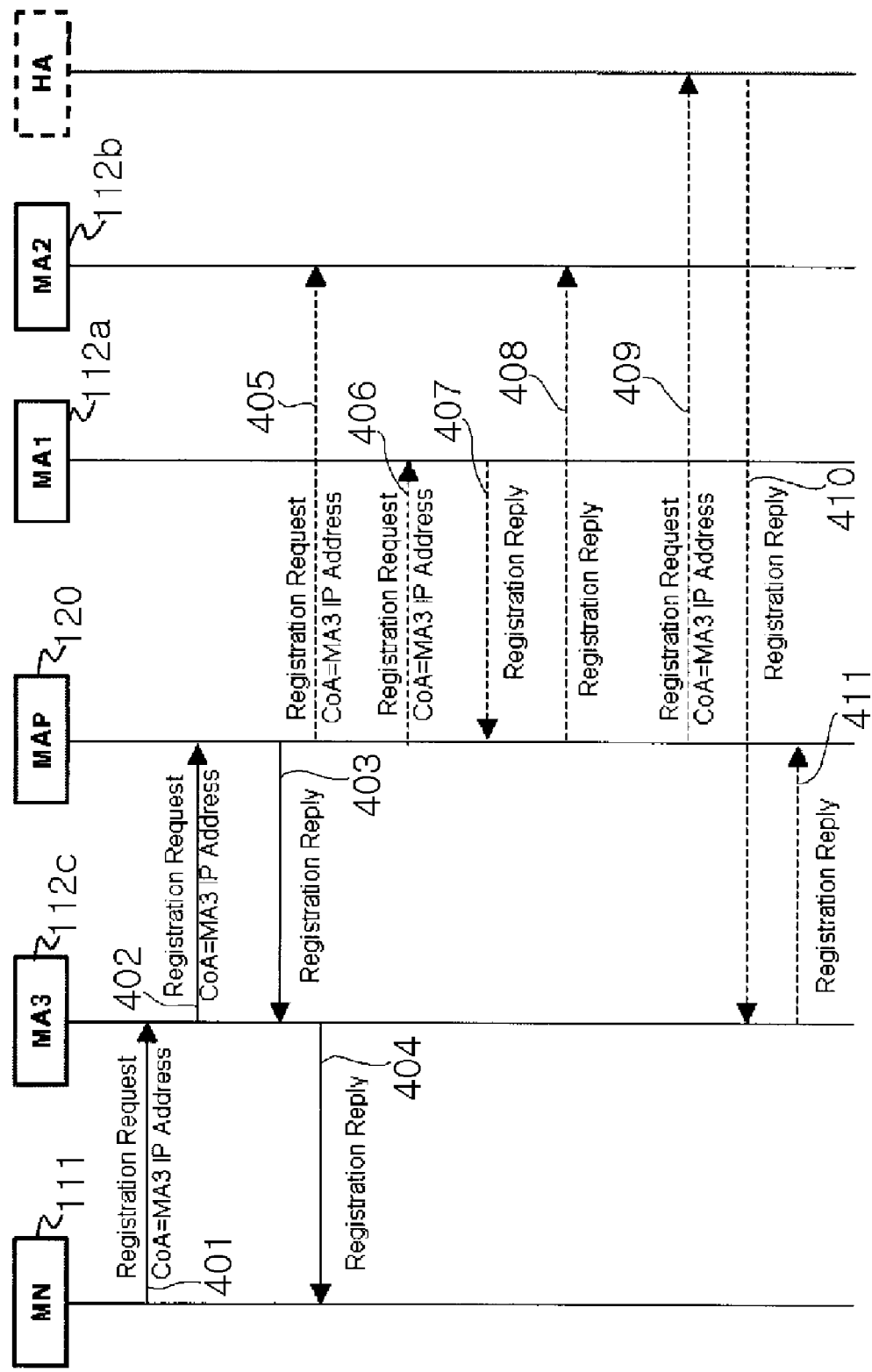
[Fig. 7]

[Fig. 8]
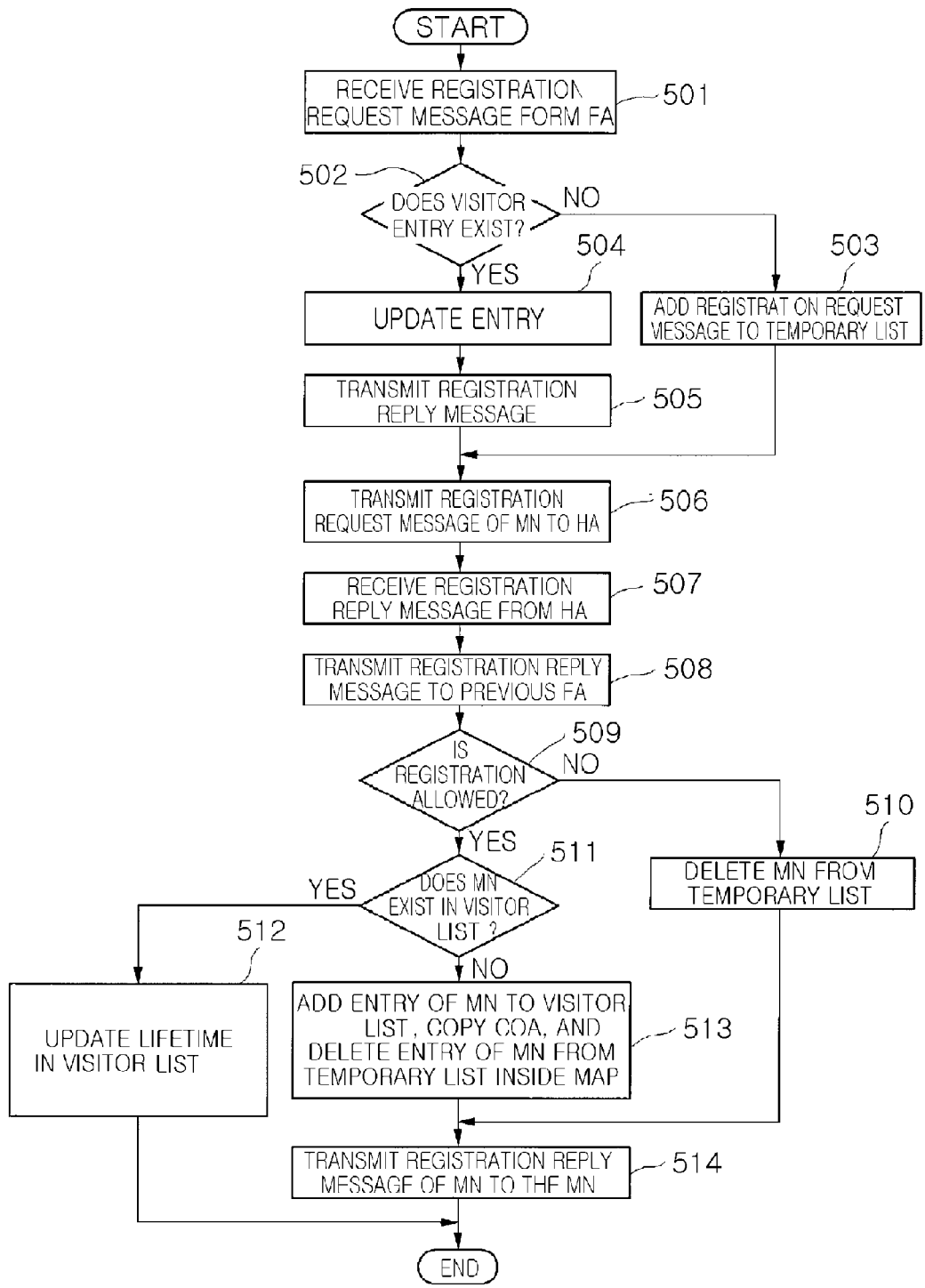

[Fig. 9]
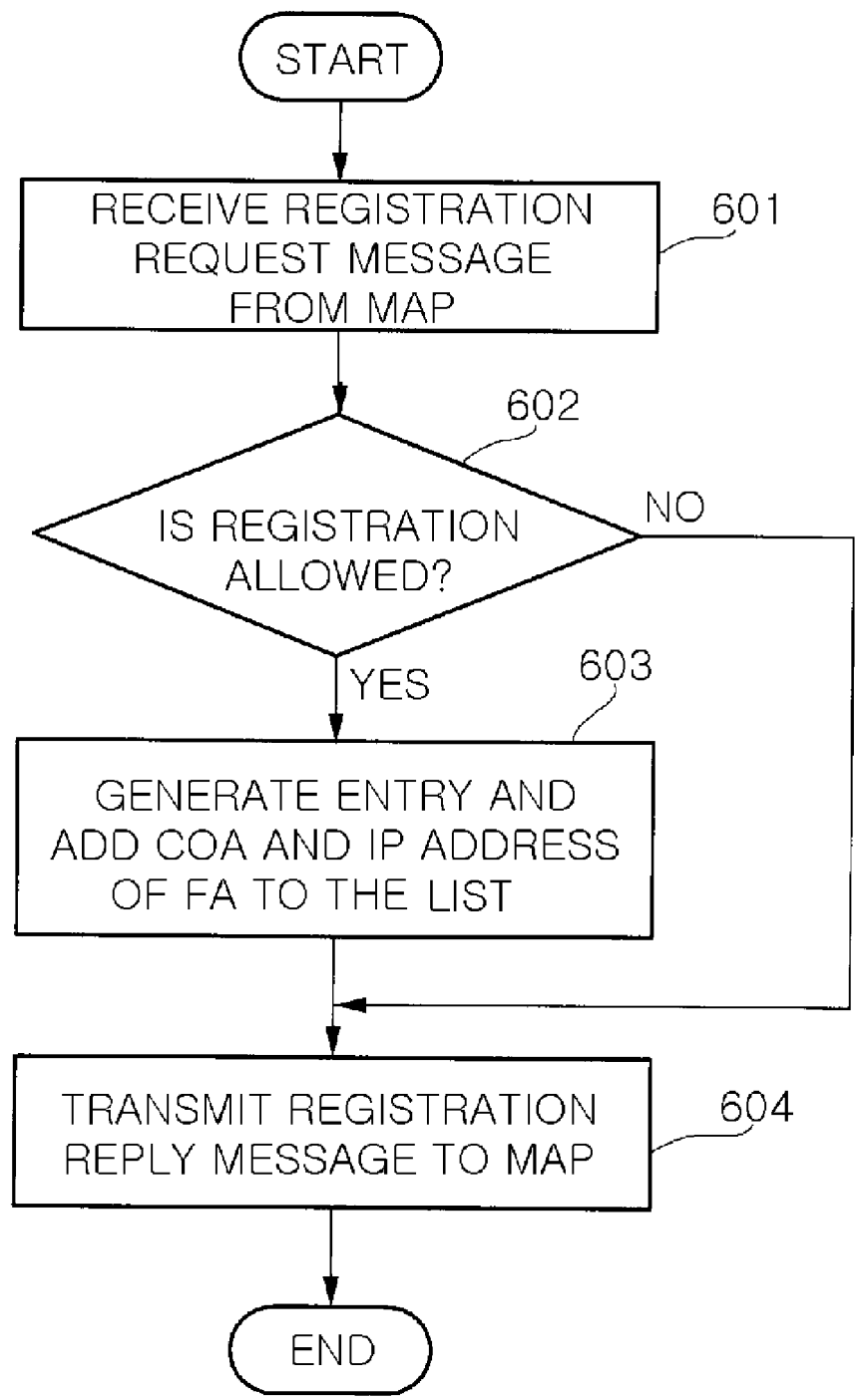

[Fig. 10]
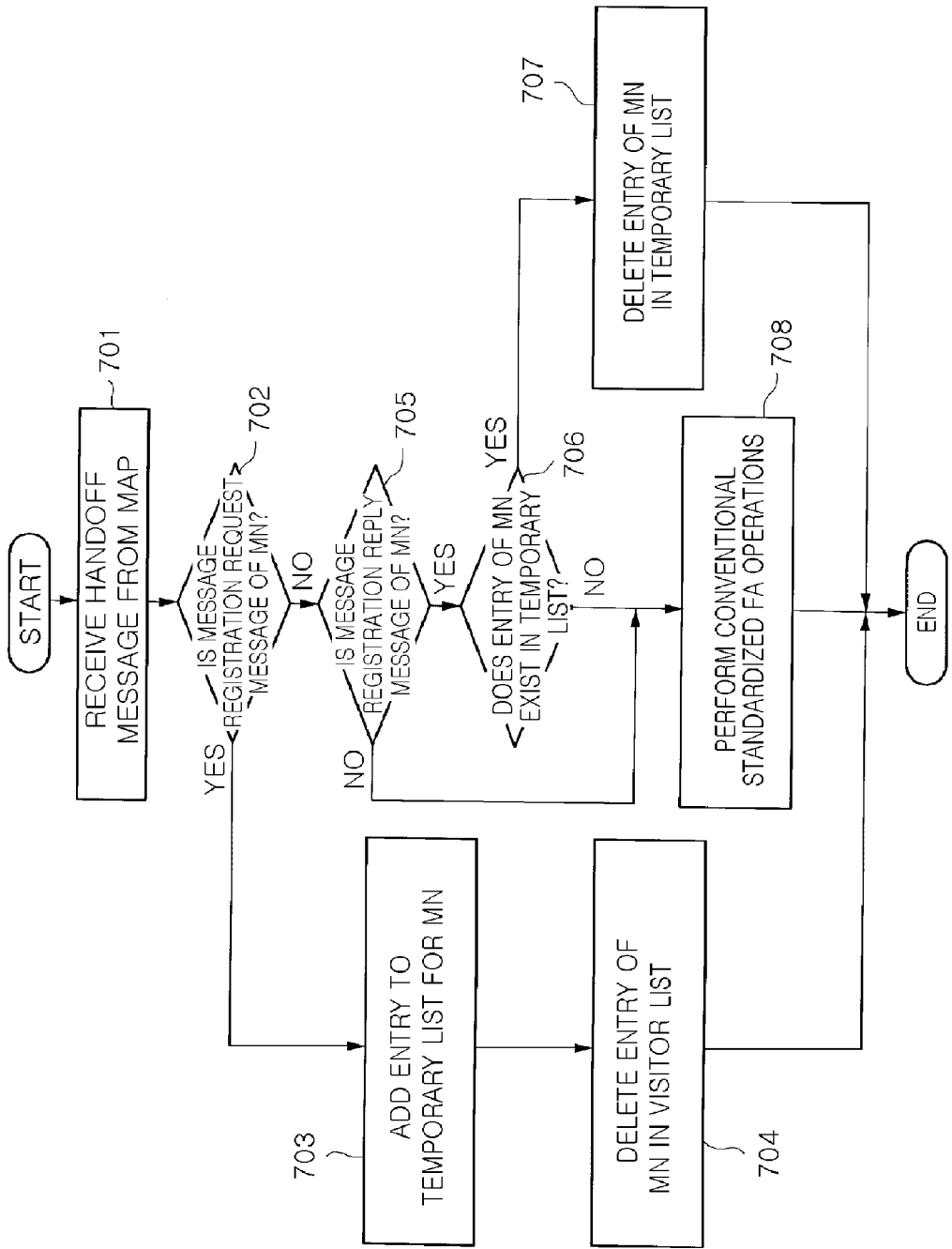

[Fig. 11]
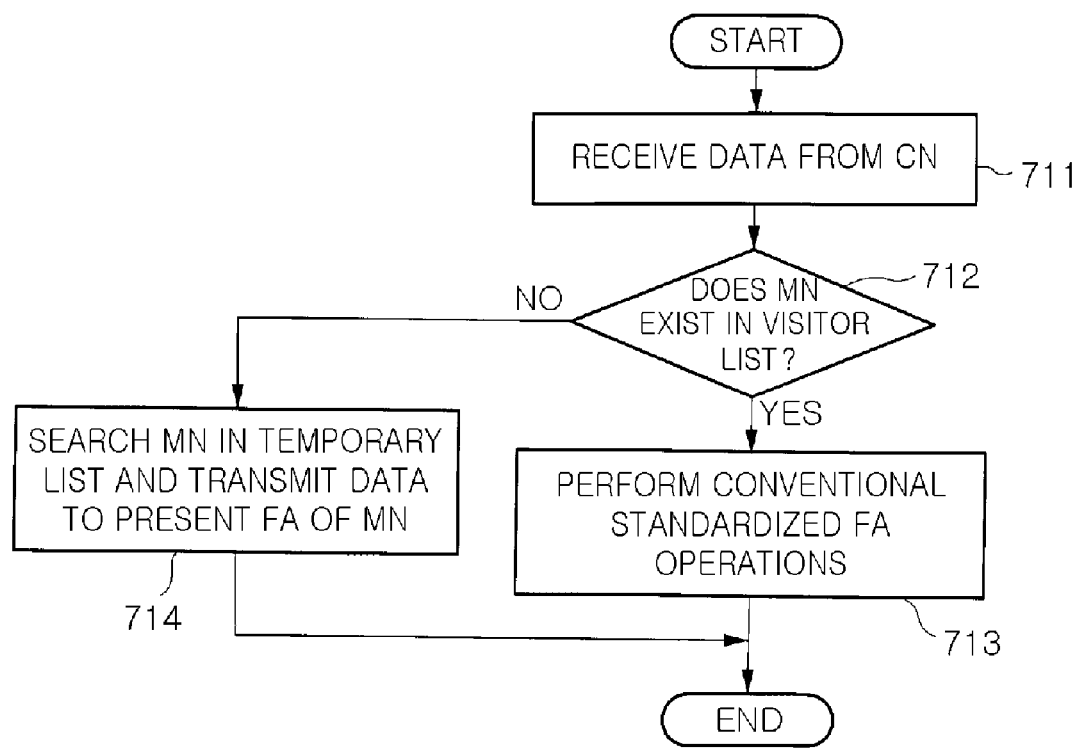

[Fig. 12]
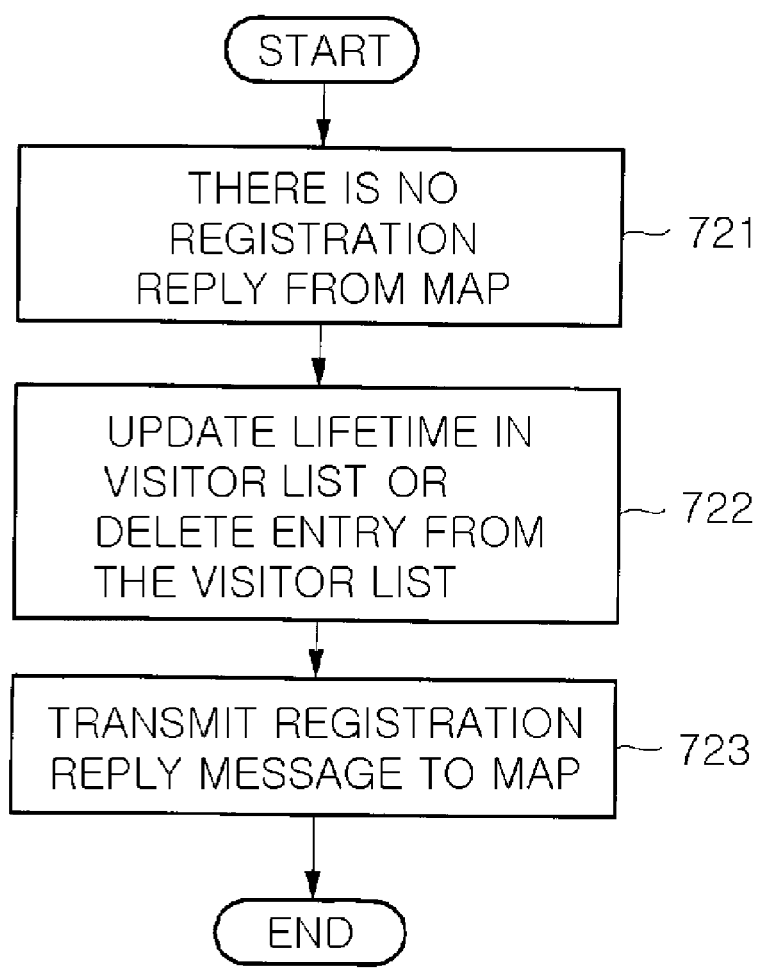

METHOD FOR MANAGING INTERNET PROTOCOL HANDOFF IN NETWORK SYSTEM

The present patent application is a national phase application of International Application No. PCT/KR2007/005339, filed Oct. 29, 2007.

TECHNICAL FIELD

The present invention relates to a method of processing Internet Protocol (IP) in a network system, and more particularly, to a method of processing IP handoff in which an IP address is changed as a mobile node moves to an external network from a network where a data packet path is separated from a handoff signal packet path.

BACKGROUND ART

In general, as handoff for mobile Internet Protocol (IP), there are Intra-subnet handoff, Inter-subnet handoff, and Inter-router handoff ("IP-based next-generation wireless networks", Jyh-Cheng & Tao Zhang, John Wiley & sons Inc., 2004). Among them, the Inter-subnet handoff in which a jurisdictional address area of a router is changed and the Inter-router handoff correspond a case in which a moving mobile node (MN) requires a new IP subnet address. When an MN moves an adjacent cell belonging to the same router, since the Intra-net handoff uses the same IP subnet address, IP handoff does not occur. That is, when an MN visits from a mobile IP network to another region of an IP address area, a foreign agent (FA) acting as a virtual router in an external network gives a care-of address (CoA) to the MN. In this case, the MN registers the CoA in a home agent HA via the FA. When the home agent HA capsulates and transmits data from the MN to the CoA, the FA undoes the capsulated data and transmits the same to the MN. In this case, the FA acts a default router of the MN, for the data sent by the MN.

When the MN moves to an adjacent cell, between base stations such as a base transceiver station (BTS) of the global system for mobile communications (GSM) and a base station (BS) of the code division multiple access (CDMA), an IP address is not changed. Accordingly, only handoff of a link level occurs. Various methods such as soft handoff are provided for the handoff of a link level at high speed.

A mobile phone such as a general CDMA system, the soft handoff method is used to provide constant services while an MN moves. However, when an Internet Protocol service is provided to the mobile phone, in the case of conventional handoff, broadcasting for handoff is provided to not only a cell where the MN belongs to, but also adjacent cells. Accordingly, a lot of resources are consumed and a serious delay occurs in sending a packet because an operation of correcting location information of the MN is previously required.

To solve the above problems, U.S. Patent Application No. 2001/0036834 A1 (filed on Nov. 1, 2001) discloses a method of allowing handoff to be quick, the method in which an MN notifies a possibility of an occurrence of a handoff operation to a subnet agent, the subnet agent sends that to a mobile agent (MA), and the MA determines adjacent subnet agents of the subnet agent where the MN belongs to, set a multicast group, and multicasts for a certain amount of time while including a packet to be sent to the MN.

However, in this case, resource consumption may occur because the packet is sent to unnecessary subnet agents for a certain period of time, and head-of-line in which a control signal packet locates a data packet of a buffer and is processed later occurs because a path for the control signal for handoff uses is identical to that of data to be sent to the MN.

As a conventional high-speed handoff, in a high-speed handoff method of an IPv6 MN, when an MN moves from an existing MA to an adjacent MA, the adjacent MA allows a communication by temporarily using an unconfirmed IP address.

However, this method is very vulnerable to Dos attacks, and the MN using the un-confirmed IP address should have an ability of changing the unconfirmed IP address to another IP address when the adjacent MA notify that the unconfirmed IP address to be used is already occupied and overlapped. Also, this method is incapable of being applied to high-speed handoff of an IPv4 MN.

However, U.S. Pat. No. 6,980,802 B2 (Dec. 27, 2005) discloses an active handoff method in which an FA1 transmits IP data from a correspondent node CN communicating with an MN to an FA2 when the MN moves from the FA1 to the FA2. In this method, when the MN is out of the FA1, the FA1 transmits a message notifying the absence of the MN to a home agent HA of the MN. Also, when the MN requests the FA2 for a location registration, the FA2 transmits a location update message to the FA1 and the FA1 transmits a binding update message to the FA2.

However, in this case, when the MN requests the FA2 for the location registration, it is unclear how to know that a previous location of the MN is the FA1, and a procedure thereof is complicated.

On the other hand, U.S. Patent Application No. 2005/0114543 (filed on May 26, 2005) discloses a method capable of being applied to an MN incapable of being aware of the existence of a gateway foreign agent (GFA) more superordinate than FAs having a different address area from each other. In this case, when an MN requests a HA for a registration via an FA, the GFA is interposed between the FA and HA in such a way that the GFA adds an IP address of the GFA to an extension field of a registration request message of the MN from the FA. Also, when the MN moves from an FA of an area A to an FA of an area B, in a process of acknowledging a registration request, when the MN is already registered, the GFA responds the MN for the registration acknowledgement. Also, when the MN is not registered, the GFM generates and adds a new visitor entry in visitor list inside the GFA and sends a registration request message to an HA of the MN by adding an IP address of the GFA to an extension field of a registration request message of the MN from the FA of the area B.

In this case, though it is possible to use a general process in which an MN is registered in a normal HA, all of the HA, the GFA, and the FA should be capable of recognizing that an address of the GFA exists in an extension field of a registration request message and processing the address. Also, when an MN is not registered a new visitor entry should be generated and added to a visitor list inside the GFA before a reply for a registration request is received from an HA. The entry should be deleted when a deny message of a binding update is received, which is very complicated. Accordingly, when a reply for the registration request message from the HA is delayed while the MN moves to another FA and requests a registration, it is possible to send information while the MN is actually not registered, since the MN already exists in visitor list, which is vulnerable to a malicious call. In addition, in the described methods, there is a problem that all data packets always pass through the GFA, thereby increasing a data transfer path.

On the other hand, in a document "Stratospheric quasi-stationary platforms: (SQ-SP) complementary to radio satellite systems", Electrical and Electronics Engineers in Israel, 1996, pp 283-286, November 1996, there is a research on whether a wireless communication method using a stationary flying object at an altitude of the stratosphere is reasonable. Generally, the research lays emphasis on power required for each frequency to transmit and receive data between a node and a high-flying object or between high flying objects and a coverage area.

Also, U.S. Pat. No. 6,167,263 (Dec. 26, 2000) discloses a platform for forming a local network using the stratosphere.

However, these methods focus on a structure of a high-flying object required for forming a local communication network using the stratosphere and controlling a location of the high-flying object. Accordingly, there is required an additional method for IP handoff of a node moving at high speed.

DISCLOSURE OF INVENTION

Technical Problem

An aspect of the present invention provides a method of processing Internet Protocol (IP) handoff in a network while distinguishing a handoff signal packet path from a data packet path.

An aspect of the present invention also provides a method of quickly processing IP handoff, the method capable of preventing a delay in sending a signal packet due to a data packet by using one of a device mounted on a high-altitude aeronautical platform (HAAP) located in a space higher than a base station such as the stratosphere and a virtual private network as a path for sending the signal packet.

Technical Solution

According to an aspect of the present invention, there is provided a method for processing Internet Protocol (IP) handoff of a plurality of mobile nodes by a mobile agent platform in a network system comprising a plurality of mobile agents and the mobile agent platform, the method comprising: receiving a registration request message from the mobile node via a arbitrary mobile agent when the mobile node moves the an arbitrary mobile agent; transmitting the received registration request message to a mobile agent where the mobile node is previously located, without change, according to whether an entry with respect to the mobile node exists in preset visitor list; and transmitting a registration reply message with respect to the registration request message to the mobile agent without change, wherein the IP handoff is processed distinguishing a signal packet path for the IP handoff from a data packet path.

According to another aspect of the present invention, there is provided a method for processing IP handoff by a arbitrary mobile agent registering a mobile node when the mobile node performs IP handoff to the mobile agent in a network system comprising a plurality of mobile agents and a mobile agent platform, wherein the network system distinguish a data packet path by setting a signal packet path for the IP handoff between the plurality of mobile agents, the method comprising: receiving a registration request message with respect to the mobile node from the mobile agent platform; determining whether to allow a registration of the mobile node, by considering the received registration request message; and transmitting a registration reply message according to a result of the determining whether to allow a registration of the mobile node, to the mobile agent platform.

According to still another aspect of the present invention, there is provided a method for processing IP handoff of a mobile node by an arbitrary mobile agent in a network system comprising a plurality of mobile agents and a mobile agent platform, the method comprising: distinguishing a signal packet path for the IP handoff set with the mobile agent platform and a data packet path; receiving and processing a message associated with the handoff from the mobile agent platform via the signal packet path; and receiving and processing a data packet from a correspondent node via the data packet path.

ADVANTAGEOUS EFFECTS

As described above, according to an aspect of the present invention, when an MN is IP handoff to an external network, a signal packet is processed being physically separated from a data packet by using an MAP that is one of an HAAP and a VPN and a head of line problem in which the signal packet for handoff is delayed by the data packet is solved, thereby quickly processing the handoff.

Also, different from a regional registration method using a GFA, contents of a registration request message sent from an FA to an HA are transmitted without change, thereby applying conventional MNs not recognizing the GFA method.

BRIEF DESCRIPTION OF THE DRAWINGS

FIG. 1 is a configuration diagram illustrating a network system for processing Internet Protocol (IP) handoff of a mobile node from a home agent to a foreign agent, according to an embodiment of the present invention;

FIG. 2 is a configuration diagram illustrating the network system of FIG. 1, in which IP handoff of a mobile node from a foreign agent to another foreign agent is processed;

FIG. 3 is a configuration diagram illustrating a network system for processing IP protocol handoff of a mobile node from a home agent to a foreign agent, according to another embodiment of the present invention;

FIG. 4 is a configuration diagram illustrating the network system of FIG. 3, in which IP handoff of a mobile node from a foreign agent to another foreign agent is processed;

FIG. 5 is a view illustrating a structure of a registration request message transmitted by the mobile node from the foreign agent to the home agent, according to the embodiments of the present invention;

FIG. 6 is a flowchart illustrating a process of processing IP handoff of a mobile node from a home agent to a foreign agent, according to still another embodiment of the present invention;

FIG. 7 is a flowchart illustrating a process of processing IP handoff of a mobile node from a foreign agent to another foreign agent, according to still another embodiment of the present invention;

FIG. 8 is a flowchart illustrating an IP handoff processing procedure in a mobile agent platform, according to the embodiments of the present invention;

FIG. 9 is a flowchart illustrating a handoff processing procedure of a home agent for a mobile node, according to the embodiments of the present invention; and FIGS. 10 through 12 are detailed flowcharts illustrating a handoff processing procedure in the foreign agent for the mobile node, according to the embodiments of the present invention.

BEST MODE FOR CARRYING OUT THE INVENTION

Hereinafter, exemplary embodiments of the present invention will now be described in detail with reference to the accompanying drawings. In the drawings, the same reference numerals are used throughout to designate the same or similar components. Only, in describing operations of the exemplary embodiments in detail, when it is considered that a detailed description on related well-known functions or constitutions unnecessarily may make essential points of the present invention be unclear, the detailed description will be omitted.

In the embodiments of the present invention, a conventional network is used as a transfer path for a data packet between terrestrial mobile agents (hereinafter, referred to as "MA") including a home agent (hereinafter, referred to as "HA") and foreign agents (hereinafter, referred to as "FA"). Also, as a path for a signal packet for processing IP handoff of a mobile node (hereinafter, referred to as "MN"), a virtual private network (VPN) between a high-altitude aeronautical platform (HAAP) and a mobile agent platform (hereinafter, referred to as "MAP") or between MAs and the MAP is used, thereby distinguishing the data packet path from the handoff signal packet path. Different from "Regional Registration" discussed in Internet Engineering Task Force (IETF), this way is capable of being applied to a general MN incapable of being aware of a gateway foreign agent (GFA) by using a conventional mobile IP signal method as it is, and it is allowed that a data packet does not pass through the GFA, thereby more easily and quickly transferring the data packet.

Also, according to documents "Establishing wireless communications service via high-altitude aeronautical platforms: a concept whose time has come?", IEEE Comm. Magazine, Vol. 35, Issue 9, pp 128-135, September 1997, "The future generation of mobile communications based on broadband access technologies", IEEE Comm. Magazine, Vol. 38, Issue 12, pp 134-142, December 2000, and "A Mobility MAnagement Protocol for IP-based cellular networks", IEEE Wireless Communications, pp 31-37, Vol. 9, Issue 3, June 20, when an HAAP located in the stratosphere is used in communications, since an altitude is less than 50 Km, generally 20 to 30 Km, an information transmission delay is short. Also, since it is possible to use a frequency band much higher than 2 GHz that is a frequency band of general mobile communications, wide band information transmission is possible.

The way of separating a data packet path from a handoff signal packet path is used or a VPN is used when there is no HAAP. A conventional mobile IP signaling method as it is and a data packet does not pass through a GFA differently from the conventional "Regional Registration", thereby more easily and quickly processing IP handoff.

Hereinafter, the embodiments of the present invention will be described in detail with reference to the attached drawings.

FIG. 1 is a configuration diagram illustrating a network system for processing Internet Protocol (IP) handoff of a mobile node from a home agent to a foreign agent, according to an embodiment of the present invention, and FIG. 2 is a configuration diagram illustrating the network system of FIG. 1, in which IP handoff of a mobile node from a foreign agent to another foreign agent is processed.

In the network system capable of performing IP handoff, in which a plurality of MAs exists, a data packet path may be separated from a handoff signal packet path by using an additional network such as the VPN.

When an MN moves from a network of an HA to a network of an FA in such a way, referring to FIG. 1, the network system includes a plurality of networks 110a to 110n and an MAP administrating networks for the HA and FAs therebetween.

A first network 110a forms a link 101a between an MA1 112a and the MAP 120 by using a VPN. Similarly, other networks 110b, 110c, . . . , 110n form links 101b, 101c, . . . , 101n between an MA2 112b, MA3, 112c, . . . , and MAn 112n and the MAP 120 by using VPNs, respectively.

As shown in FIG. 1, when an MN 111a subscribes to the MA1 112a, the MA1 112a becomes an HA of the MN 111a. In this case, an MN 111b shows a move shown as a thick arrow. Accordingly, since the MN 111a is identical to the MN 111b, they are commonly called as an MN 111 for convenience of description.

The MA2 112b, MA3 112c, . . . , MAn 112n become FAs of the MN 111. Also, a correspondent node (CN) 130 transmits and receives an IP packet with the MN 111 and may be one of another MN in an administration region of the MAP 120 and another general node connected to Internet.

In the described network system, when an MN moves from a network to which the MN moves, to another network, a network structure is as shown in FIG. 2. That is, referring to FIG. 2, only, the MN 111b moves from a network of an FA to a network of another FA and becomes an MN 111c. Accordingly, the configuration of FIG. 1 is identical to the configuration of FIG. 2. In this case, the MA1 112a becomes an HA of the MN 111c, and hereinafter, the MN 111b and the MN 111c are commonly called as the MN 111.

As shown in FIGS. 1 and 2, when the MA1 112a, MA2 112b, MA3 112c, . . . , MAn 112n, which belong to the same network 110, act as FAs, that is, when the MN 111 not registered in their own networks sends a registration request message, the message is set to be sent to the MAP 120 instead of sending to the HA. Also, a reply for the registration request message of the MN 111 from other FAs is previously set to be sent to the MAP 120.

On the other hand, in another embodiment of the present invention, a structure, in which a plurality of MAs exists and a data packet path is separated from a handoff signal packet path by using an HAAP, will be described with reference to the attached drawings.

FIG. 3 is a configuration diagram illustrating a network system for processing IP protocol handoff of an MN from an HA to an FA, according to another embodiment of the present invention, and FIG. 4 is a configuration diagram illustrating the network system of FIG. 3, in which IP handoff of an MN from an FA to another FA is processed.

Referring to FIG. 3, the network system includes an HAAP 210 located at a space such as the stratosphere and the MAP 120 including networks 110 of a plurality of MAs 112 in the region administrated via the HAAP 210. In the network system, the MN 111 is IP handoff from a network of an arbitrary MA corresponding to an HA, to a network of a foreign MA.

The first network 110a forms a wireless link 201a between the MA1 112a and the HAAP 210. Similarly, other networks 110b, 110c, . . . , and 110n also form wireless links 201b, 201c, . . . , and 201n between the MA2 112b, MA3 112c, . . . , and MAn 112n and the HAAP 210, respectively. The MAP 120 forms a wireless link 202 with the HAAP 210. Except for the wireless link configuration, the network system according to another embodiment of the present invention has a similar structure to that of the network system of FIG. 1. Accordingly, detailed description will be omitted.

In the described network system, when an MN moves from a network to which the MN moves, to another network, a network system structure is as shown in FIG. 4. Only, the MN 111b moves from a network of an FA to a network of another FA and becomes an MN 111c.

An IP handoff method in an IP MN network structure in which a plurality of MAs exists and a data packet path is separated from a handoff packet path will be described.

An IP handoff processing procedure performed when an MN moves from a network MA1 of the HA or a network of an FA to a network MA2 of another FA will be described. In this case, the MN does not exist in visitor list inside an MAP.

FIG. 5 is a view illustrating a structure of a registration request message transmitted by the mobile node from the foreign agent to the home agent, according to the embodiments of the present invention, and FIG. 6 is a flowchart illustrating a process of processing IP handoff of an MN from an HA to an FA, according to still another embodiment of the present invention.

Referring to FIG. 6, the MN 111 transmits a registration request message to the MA2 112b in 301, and the MA2 112b forwards the registration request message to the MAP 120 in 302. In this case, the registration request message is as shown in FIG. 5, which is a standardized registration request format sent from a network of the MN, in which the network acts as an FA, to an HA via the FA by MN. In the format, a first line indicates lifetime, other lines indicate a home address of the MN, the HA, and a care-of address (CoA) of the FA, respectively. In this case, the lifetime may be adjusted by the HA.

In 303, the MAP 120 transmits contents of an HA in the registration request message to the MA1 112a that is the HA of the MN 111, without change. In this case, a CoA of the registration request message corresponds to an IP address of the MA2 112b. In 304 through 306, the MAP 120 transmits a registration reply message received from the MA1 112a to the MN 111 via the MA2 112b.

An IP handoff processing procedure performed when an MN moves from a network of an FA, that is, the MA2 to a network of another FA, that is, the MA3 will be described with reference to the attached drawings. In this case, the MN does not exist in visitor list inside an MAP.

FIG. 7 is a flowchart illustrating a process of processing IP handoff of an MN from an FA to another FA, according to still another embodiment of the present invention.

Referring to FIG. 7, in 401 and 402, the MN 111 transmits a registration request message to the MAP 120 via the MA3 112c. In 403 and 404, the MAP 120 transmits a registration reply message to the MN 111.

In 405 and 406, the MAP 120 transmits the registration request message to the MA2 112b and MA1 112a, without a change in contents of an HA. The MAP 120 transmits a reply message to the MA2 112b, the reply message which is not sent to the MN 111, and corrects lifetime information with respect to the MN 111, the information stored inside the MAP 120, according to a lifetime of the reply message.

Also, when the MAP 120 the registration request message to the HA located out of the network system region 110 in 408, the MA3 112c receives a registration reply message from the HA and transmits the reply message to the MAP 120 in 409 and 410. In this case, a CoA of the registration request message corresponds to an IP address of the MA3 112c.

Handoff processing procedures performed in respective nodes, that is, an MAP and an HA will be described in detail with reference to the attached drawings. First, the handoff processing procedure of the MAP will be described. In this case, the MAP 120 has a visitor entry of the MN 111 and a temporary list to process handoff with respect to the MN 111, the MA1, MA2, . . . , and MAn 112a, 112b, . . . , and 112n act as FAs with respect to the MN 111.

FIG. 8 is a flowchart illustrating an IP handoff processing procedure in an MAP, according to the embodiments of the present invention.

Referring to FIG. 8, the MAP 120 receives a registration request message from an FA in 501, checks a visitor entry by using the received registration request message in 502, and checks whether the visitor entry of the MN exists in visitor list administrated by the MAP 120. When the visitor entry of the MN does not exist in the visitor list, the MAP 120 newly generates the registration request message of the MN to the temporary list in 503 and skips from 503 to 506.

On the other hand, when the visitor entry of the MN exists in the visitor list, the MAP 120 updates the entry of the MN, that is, a CoA in the visitor list inside the MAP 120 in 504 and transmits a registration reply message to the FA transmitting the registration request message, instead of the HA of the MN in 505. In 506, the MAP 120 transmits the registration request message to the HA of the MN and the previous FA, without change.

In 507, the MAP 120 receives the registration reply message from the HA of the MN in 507, transmits registration replay message to previous FA in 508. The MAP 120 checks whether a registration is allowed, in 509. When the registration is rejected, the MAP 120 deletes the stored temporary list for the MN in 510 and skips from 510 to 514.

On the other hand, when the registration is allowed, the MAP 120 checks whether the MN exists in the inside visitor list in 511. When the MN exists in the inside visitor list in 512, the MAP 120 changes a lifetime in the visitor list, corresponding to the entry of the MN by a lifetime of the registration reply message received from the HA in 512 and finishes the operation.

As a result of the checking in 511, when the MN does not exist in the visitor list, the MAP 120 additionally generates the entry of the MN in the visitor list, copies and stores the registration reply message of the MN a CoA of the temporary list in the entry of the MN, and deletes the entry of the MN in the temporary list in 513. In 514, the MAP 120 transmits the registration reply message to the MN via the FA in 514 and finishes the operation.

On the other hand, to reduce a lifetime in the visitor list of its own, the MAP 120 processes as a conventional MA and deletes an MN entry from the visitor list when the lifetime is expired.

A handoff processing procedure of an FA for an MN according to an exemplary embodiment of the present invention will be described.

FIG. 9 is a flowchart illustrating a handoff processing procedure of an HA for an MN, according to the embodiments of the present invention.

Referring to FIG. 9, in 601, FAs MA1, MA2, MA3, and MAn receive a registration request message from the MAP 120 when an MN registered therein requests a registration and checks whether the registration of the MN is allowed in 602. As a result of the checking, when the registration of the MN is rejected, in 604, the FA transmits a registration reply message including the rejection to the MAP 120.

On the other hand, when the registration of the MN is allowed, in 603, the FA generates an entry of the MN and adds a CoA and an IP address of the FA to which the MN belongs, to the generated entry of the MN. In 604, the FA transmits a registration reply message including a registration reply to the MAP 120.

The IP handoff processing procedure with respect to an MN in an FA will be described in detail with reference to FIGS. 10A through 10C.

FIGS. 10A through 10C are detailed flowcharts illustrating the handoff processing procedure in the FA for the MN, according to the embodiments of the present invention.

Referring to FIG. 10, in 701, the FA receives a message associated with handoff from an MAP, that is, one of a registration request message and a registration reply message for IP handoff of the MN.

In 702, the FA checks whether the received message is a registration request message. When the message is the registration request message, in 703 the FA copies and adds the registration request message as an entry of the MN in a temporary list of its own. In 704, the FA deletes an entry corresponding to the MN from visitor list of its own.

On the other hand, as a result of the checking in 702, when the message is not the registration request message, in 705, the FA checks whether the message is a registration reply message with respect to the MN. In this case, as a result of the checking, when the message is the registration reply message, in 706, the FA checks whether an entry of the MN, corresponding to the registration reply message, exists in the temporary list of its own. In this case, when the entry of the MN exists, the FA deletes the entry of the MN in the temporary list in 707, and finishes the operation. On the other hand, when the entry does not exist, operation 708 is performed.

Also, as a result of the checking in 705, when the message is not the registration reply message, the FA performs conventional standardized FA operations in 708. That is, in this case, since the operations according to an exemplary embodiment of the present invention are incapable of being applied to the registration request message received from the MN, the conventional standardized FA operations except for the operation according to the present embodiment are performed.

On the other hand, as shown in FIG. 11, when the FA receives a data packet from the CN 130 in 711, the FA checks whether an MN that is a destination node of the data packet exists in the visitor list of its own in 712. In this case, when the MN exists, the FA performs the conventional standardized FA operations in 713. On the other hand, when the MN does not exist, the FA searches the entry of the MN from the temporary list of its own and transmits the data packet received from the CN to an FA where the MN visits at present in 714 and finishes the operation.

Also, as shown in FIG. 12, when the FA receives the registration reply message with respect to the MN from another MA instead of the MAP in 721, the FA updates a lifetime of the entry of the MN in the visitor list or deletes the entry of the MN from the visitor list, according to contents of the registration reply message in 722. This corresponds to the conventional standardized FA operations. In 723, the FA transmits the registration reply message to the MAP.

As described above, data packets between the CN 130 and the MN 111, except for a handoff signal packet, are transmitted via paths not including the MAP, such as CN→HA→FA→MN and MN→FA→CN.

As described above, IP handoff is capable of being quickly and seamlessly serviced by forming a network in which information for processing handoff between MAs and an MAP is transmitted by using one of an HAAP and a VPN, separated from a conventional data transmission network. Also, different from a regional registration method using a GFA, contents of a registration request message sent from an FA to an HA are transmitted without change, thereby applying conventional MNs not recognizing the GFA method.

The invention claimed is:

1. A method for processing Internet Protocol (IP) handoff of a plurality of mobile nodes by a mobile agent platform in a network system comprising a plurality of mobile agents and the mobile agent platform, the method comprising:
 receiving a registration request message from one of the plurality of mobile nodes via an arbitrary mobile agent when the mobile node moves to the arbitrary mobile agent;
 transmitting the received registration request message to a mobile agent where the mobile node is previously located, without change, according to whether an entry with respect to the mobile node exists in preset visitor list; and
 transmitting a registration reply message with respect to the registration request message to the arbitrary mobile agent without change, wherein the IP handoff is processed distinguishing a signal packet path for the IP handoff from a data packet path.

2. The method of claim 1, wherein the transmitting the received registration request message comprises:
 adding the registration request message to a temporary list when the entry with respect to the mobile node does not exists in the visitor list;
 transmitting the registration request message to a home agent where the mobile node is registered;
 updating the entry with respect to the mobile node by receiving a registration reply from the home agent; and
 transmitting the registration request message to the mobile agent where the mobile node is previously located, without change.

3. The method of claim 1, further comprising updating the entry with respect to the mobile node instead of transmitting the registration request message to the mobile agent where the mobile node is previously located, when the entry with respect to the mobile node exists in the visitor list.

4. The method of claim 1, wherein the transmitting the received registration request message comprises:
 adding the registration request message to a temporary list when the mobile node moves from the arbitrary mobile agent to another mobile agent and the entry with respect to the mobile node does not exist in the visitor list;
 transmitting the registration request message to the arbitrary mobile agent and a home agent where the mobile node is registered, without change;
 receiving a registration reply message from the home agent; and
 transmitting the received registration reply message to the arbitrary mobile agent.

5. The method of claim 4, further comprising:
 updating the entry with respect to the mobile node when the entry with respect to the mobile node exists in the visitor list; and
 transmitting the registration reply message to the another mobile agent where the mobile node presently exists, instead of the home agent.

6. The method of claim 4, further comprising:
 updating a lifetime in the visitor list when a registration of the mobile node is allowed and the entry with respect to the mobile node exists in the visitor list;
 adding the entry with respect to the mobile node to the visitor list when the entry with respect to the mobile node does not exists in the visitor list; and
 deleting the entry with respect to the mobile node from the temporary list.

7. The method of claim 6, further comprising deleting the entry with respect to the mobile node from the temporary list when the registration of the mobile node is rejected.

8. The method of claim 5, wherein the registration reply message comprises the entry with respect to the mobile node, the entry to which a care-of address and an IP address of the mobile agent where the mobile node is located are added.

9. A method for processing IP handoff by a mobile agent registering a mobile node when the mobile not performs IP handoff to an arbitrary mobile agent in a network system comprising a plurality of mobile agents and a mobile agent platform, the method comprising:

receiving a registration request message with respect to the mobile node from the mobile agent platform;

determining whether to allow a registration of the mobile node, by considering the received registration request message; and transmitting a registration reply message according to a result of the determining whether to allow a registration of the mobile node, to the mobile agent platform, wherein the registration reply message is sent through a channel separate from a channel used to transfer data packets between the mobile node and the mobile agent platform, wherein the method further comprises adding an entry to the registration reply message by generating the entry with respect to the mobile node when the registration of the mobile node is allowed.

10. Method of claim 9, wherein the registry reply message comprises the entry with respect to the mobile node, the entry to which a care-of address and an IP address of the mobile agent where the mobile ode is located are added.

11. A method for processing IP handoff of a mobile node by an arbitrary mobile agent in a network system comprising a plurality of mobile agents and a mobile agent platform, the method comprising:

distinguishing a signal packet path for the IP handoff set with the mobile agent platform and a data packet path;

receiving and processing a message associated with the handoff from the mobile agent platform via the signal packet path; and receiving processing a data packet from a correspondent node via the data packet path, wherein the receiving and processing the message associated with the handoff comprises:

receiving the message associated with the handoff from the mobile agent platform;

adding a registration request message in a preset temporary list of itself, as an entry with respect to the mobile node, if the message associated with the handoff is the registration request message of the mobile node; and deleting the entry with respect to the mobile node in a preset visitor list of itself.

12. The method of claim 11, wherein the receiving and processing a message associated with the handoff further comprises deleting the entry with respect to the mobile node from the temporary list when the message associated with the handoff is the registration reply message of the mobile node and the entry with respect to the mobile node exists the preset temporary list itself.

13. The method of claim 12, wherein, the receiving and processing a message associated with the handoff further comprises deleting the entry with respect to the mobile node in the preset visitor list according to contents of the registration reply message when receiving the registration reply message from another mobile agent.

14. The method of claim 11, wherein the receiving and processing a data packet from a correspondent node comprises:

receiving the data packet from the correspondent node;

searching the entry with respect to the mobile node in a preset visitor list of itself, the entry that is a destination of the received data packet;

searching the entry with respect the mobile node in a the preset temporary list of itself; and sending the received data packet to the mobile node via a another mobile agent where the mobile node moves to, when the entry with respect to the mobile node does not exist in the preset visitor list.

* * * * *